United States Patent
Pantano-De-Luca et al.

(10) Patent No.: US 11,993,255 B2
(45) Date of Patent: May 28, 2024

(54) VEHICLE COLLISION AVOIDANCE METHOD AND SYSTEM

(71) Applicant: ARRIVER SOFTWARE AB, Linköping (SE)

(72) Inventors: Fabio Pantano-De-Luca, Dachau (DE); Joseph Frikken, Marysville, MI (US)

(73) Assignee: Arriver Software AB, Linköping (SE)

( * ) Notice: Subject to any disclaimer, the term of this patent is extended or adjusted under 35 U.S.C. 154(b) by 366 days.

(21) Appl. No.: 17/057,485

(22) PCT Filed: May 24, 2019

(86) PCT No.: PCT/IB2019/054313
§ 371 (c)(1),
(2) Date: Nov. 20, 2020

(87) PCT Pub. No.: WO2019/229602
PCT Pub. Date: Dec. 5, 2019

(65) Prior Publication Data
US 2021/0309216 A1   Oct. 7, 2021

(30) Foreign Application Priority Data
May 28, 2018   (EP) .................................... 18174473

(51) Int. Cl.
*B60W 30/09*   (2012.01)
*B60W 10/02*   (2006.01)
(Continued)

(52) U.S. Cl.
CPC ............ *B60W 30/09* (2013.01); *B60W 10/02* (2013.01); *B60W 10/04* (2013.01); *B60W 10/18* (2013.01);
(Continued)

(58) Field of Classification Search
CPC ...... B60W 30/09; B60W 10/02; B60W 10/04; B60W 10/18; B60W 30/0956;
(Continued)

(56) References Cited

U.S. PATENT DOCUMENTS 6,607,255 B2   8/2003   Bond, III et al.
8,489,286 B2   7/2013   Kobayashi et al.
(Continued)

FOREIGN PATENT DOCUMENTS

| EP | 2263926 A2 | 12/2010 |
|---|---|---|
| EP | 2484566 A1 | 8/2012 |
| WO | 2018047223 A1 | 3/2018 |

OTHER PUBLICATIONS

European Search Report—EP18174473—Search Authority—Munich—dated Jan. 22, 2019.
(Continued)

*Primary Examiner* — Tyler D Paige
(74) *Attorney, Agent, or Firm* — Arriver Software AB

(57) ABSTRACT

An on-board system of a vehicle scans for target entities in at least one lane to a side of the vehicle and determines position and state of motion of detected target entities. From a state of the vehicle, an intention is inferred of a driver to move the vehicle into one of the at least one lane. If the on-board system detects a risk of collision between a target entity and the vehicle, then the motion of the vehicle is impeded by the system applying brakes of the vehicle and/or reducing a driving torque of the vehicle. A speed of the vehicle is monitored and a motion of the vehicle is not impeded if the speed of the vehicle is above a threshold speed.

13 Claims, 4 Drawing Sheets

(51) Int. Cl.
*B60W 10/04* (2006.01)
*B60W 10/18* (2012.01)
*B60W 30/095* (2012.01)

(52) U.S. Cl.
CPC ... *B60W 30/0956* (2013.01); *B60W 2420/403* (2013.01); *B60W 2420/408* (2024.01); *B60W 2420/54* (2013.01); *B60W 2520/10* (2013.01); *B60W 2520/12* (2013.01); *B60W 2540/215* (2020.02); *B60W 2540/30* (2013.01); *B60W 2554/4026* (2020.02); *B60W 2554/4029* (2020.02); *B60W 2554/4041* (2020.02); *B60W 2554/80* (2020.02); *B60W 2554/803* (2020.02); *B60W 2554/804* (2020.02); *B60W 2556/45* (2020.02); *B60W 2710/0666* (2013.01); *B60W 2710/083* (2013.01); *B60W 2710/18* (2013.01)

(58) Field of Classification Search
CPC ......... B60W 2420/42; B60W 2420/52; B60W 2420/54; B60W 2520/10; B60W 2520/12; B60W 2540/215; B60W 2540/30; B60W 2554/4026; B60W 2554/4029; B60W 2554/4041; B60W 2554/803; B60W 2554/804; B60W 2556/45; B60W 2710/0666; B60W 2710/083; B60W 2710/18; B60W 2520/06; B60W 2540/06; B60W 2540/18; B60W 2540/20; B60W 2554/00; B60W 2554/80; B60W 30/0953; B60W 30/18163; G08G 1/168; G08G 1/167

USPC ......................................................... 701/26
See application file for complete search history.

(56) References Cited

U.S. PATENT DOCUMENTS

| | | | |
|---|---|---|---|
| 9,731,717 | B2 | 8/2017 | Kim et al. |
| 10,347,125 | B2* | 7/2019 | Camacho .............. B60W 50/14 |
| 10,407,060 | B2 | 9/2019 | Kim et al. |
| 10,611,383 | B2* | 4/2020 | Bae ................... B60W 50/0098 |
| 10,755,117 | B2 | 8/2020 | Suzuki et al. |
| 11,004,341 | B2* | 5/2021 | Baba ...................... G06V 20/58 |
| 2003/0132666 | A1 | 7/2003 | Bond, III et al. |
| 2008/0300755 | A1 | 12/2008 | Madau et al. |
| 2009/0138201 | A1 | 5/2009 | Eckstein et al. |
| 2010/0324823 | A1 | 12/2010 | Kobayashi et al. |
| 2012/0025969 | A1* | 2/2012 | Dozza .................... G08G 1/167 340/463 |
| 2012/0203435 | A1 | 8/2012 | Brannstrom et al. |
| 2013/0342330 | A1* | 12/2013 | Kiefer ...................... G08B 6/00 340/407.1 |
| 2016/0114798 | A1 | 4/2016 | Kim et al. |
| 2017/0309092 | A1* | 10/2017 | Rosenbaum ........ G01M 17/007 |
| 2017/0369077 | A1* | 12/2017 | Hirano ................. G05D 1/0061 |
| 2018/0086338 | A1 | 3/2018 | Yamada et al. |
| 2019/0197322 | A1 | 6/2019 | Suzuki et al. |

OTHER PUBLICATIONS

International Search Report and Written Opinion of PCT/IB2019/054313, dated Oct. 16, 2019.
European Search Report of EP 3 575 171 A1, dated Jan. 8, 2019.

* cited by examiner

VEHICLE COLLISION AVOIDANCE METHOD AND SYSTEM

CROSS-REFERENCE TO RELATED APPLICATIONS

This application is a 35 U.S.C. § 371 national phase of PCT International Application No. PCT/162019/054313, filed May 24, 2019, which claims the benefit of priority under 35 U.S.C. § 119 to European Patent Application No. 18174473.1, filed May 28, 2018, the contents of which are incorporated herein by reference in their entirety.

FIELD OF THE INVENTION

The present invention relates to a method and system for avoiding a collision of a vehicle with another entity.

BACKGROUND

Motor vehicle collision avoidance systems as such are already known. For example, U.S. Pat. No. 6,607,255 (B2) discloses a system configured to apply brakes in a smooth way in order to avoid a collision, if the system has detected a risk of such a collision. The system furthermore allows the driver to take different measures, like accelerating, in order to avoid a collision, depending on a state of the vehicle, without the driver losing time switching off the system. The disclosed system addresses the problem of collision avoidance while the vehicle is in motion.

US Publication No. 2008/0300755 (A1) relates to a system for lateral collision avoidance and in particular addresses the problem of a "blind spot" of the driver of a vehicle. The system has a direction sensor generating a direction signal corresponding to a change in direction of the vehicle and a detector for detecting external objects. The system can activate brakes of the vehicle in a controlled manner to avoid collision with detected objects. This can in particular include a "steering-by-braking" approach.

EP Publication No. 2 484 566 (A1) discloses a method for automatic braking of a vehicle in order to avoid collision with road users in adjacent lanes. The method includes activating brakes of the vehicle if a collision cannot be avoided simply by steering the vehicle.

Lateral collision avoidance includes yet different problems. A typical situation occurs if a previously stationary vehicle, like for instance a car, e.g. on an assist lane on a highway or parked, intends to enter a traffic lane to a side of the vehicle. Such a situation is potentially dangerous for both the driver of the vehicle and other traffic. It is known to use lateral scanning systems to detect entities on a lane to the side of the vehicle and to generate a warning signal, e.g. acoustic and/or visual, for the driver of the system. This may not always be sufficient to avoid a collision; for example, a distracted driver may not react to the warning signal or may react too late, or the driver may misjudge the situation, e.g. underestimate the speed of an approaching car.

The object of the present invention is to provide a method and corresponding system for a more reliable avoidance of a collision of a vehicle with traffic in a lane to the side of the vehicle.

The object is achieved by embodiments of a method and a system described and claimed herein.

SUMMARY AND INTRODUCTORY DESCRIPTION OF EMBODIMENTS OF THE INVENTION

In the method according to the invention for collision avoidance of a vehicle, at least one lane to a side of the vehicle, into which the vehicle is to enter, is scanned for target entities. The scanning is done with a scanning system on board the vehicle. If the scanning system detects at least one target entity, the scanning system also gathers information on position and state of motion of the at least one target entity. The state of motion of the target entity includes direction and speed of movement of the target entity. A target entity, generally speaking, is any animate or inanimate entity with a potential to be involved in a collision with the vehicle. Target entities in particular may include motorised vehicles like cars, trucks, motorbikes, non-motorised vehicles like bicycles, pedestrians, animals, stationary obstacles. It is not a requirement that the scanning system or any data processing system on board the vehicle be capable of distinguishing between different types of target entity, like the types and examples just given. It is sufficient if the scanning system can detect the presence of a target entity and collect information on the position and state of motion of the target entity.

According to the inventive method also information on a state of the vehicle is gathered. The information is such that it is indicative of an intention of a driver of the vehicle to enter into the at least one lane scanned for target entities; it is to be noted that the vehicle may have to cross, and thereby enter into, one or more lanes before reaching a lane along which the driver of the vehicle wishes to journey. Various sensors on board the vehicle may be used to gather this information; these sensors may include sensors specifically placed for the purpose of the invention, as well as sensors originally provided for different purposes, the sensor output of which is, besides their original purpose, also used for the method according to the invention. Furthermore, this information may include results of calculations or of more general data processing performed by any suitably configured on-board system of the vehicle.

Next, the gathered information, both on the position and state of motion of the at least one target entity and on the state of the vehicle, is evaluated in order to determine a likelihood of a collision between the at least one target entity and the vehicle. If the determined likelihood is above a pre-defined threshold, then according to the inventive method, a motion of the vehicle is impeded, by activating brakes of the vehicle and/or by reducing a driving torque of the vehicle. In this way, the vehicle is reliably prevented from entering the at least one lane scanned for target entities, if there is a risk of collision with such a target entity. As the method uses active measures, applying brakes and/or torque reduction, the method also works if the driver is distracted or misjudges a speed of the target entity. The evaluation of the gathered information may in particular be performed by a data processing system on board the vehicle. The evaluation may at least partially rely on statistical methods, and may, for instance, use statistical estimators. The data processing system may also send out a control signal to activate brakes of the vehicle or reduce the driving torque of the vehicle, if the determined likelihood is above the pre-defined threshold. According to the invention a speed of the vehicle is monitored, and a motion of the vehicle is not impeded if the speed of the vehicle is above a pre-defined threshold.

The state of the vehicle mentioned above may in particular include at least one of the following: An on/off-state of the driving engine of the vehicle, a turning position of a steering wheel of the vehicle, a gear of the vehicle set to a driving mode or parking mode, an on/off-state of a blinker of the vehicle, an acceleration command from the driver, e.g. a pressed throttle pedal. Advantageously, the method will rely on more than one of these examples. For instance, if the engine of the vehicle is on, the steering wheel is turned such that the vehicle would move towards the at least one lane scanned, a gear is set to a driving mode, and if the driver presses the throttle pedal, then this may be taken as a clear indication of the driver's intention to move the vehicle into one of the at least one lane scanned for target entities. In this case, if a target entity is detected in the at least one lane scanned and if a likelihood of a collision above the pre-defined threshold is found by the method, the motion of the vehicle may be impeded as described above. Torque converters on automatic transmissions are a further source of information indicating a driver's intention to move the vehicle. The information on the state of the vehicle may furthermore include a speed of the vehicle.

In an embodiment, the evaluation of the gathered information on the position and state of motion of the at least one target entity and on the state of the vehicle results in a likelihood of a collision above the pre-defined threshold, if a relative speed between at least one of the at least one target entity and the vehicle is above a pre-defined threshold.

In an embodiment, the evaluation of the gathered information on the position and state of motion of the at least one target entity and on the state of the vehicle results in a likelihood of a collision above the pre-defined threshold, if a time for at least one of the at least one target entity to approach within a pre-defined minimum distance from the vehicle is below a pre-defined threshold.

The system according to the invention is on board the vehicle and configured to perform the method according to the invention as described above.

The system according to the invention comprises a scanning system configured to scan for target entities in at least one lane to a side of the vehicle, one or plural sensors configured to provide information on a state of the vehicle, and a data processing system. The data processing system is connected to the scanning system to receive information on position and state of motion of target entities detected by the scanning system, and is furthermore connected to the one or plural sensors to receive information on the state of the vehicle. The data processing system may furthermore be configured to receive information from other on-board systems of the vehicle. These other on-board systems may include sensors originally provided on board the vehicle for other purposes than the invention, the sensor output of which is advantageously used also for the purpose of the invention. The other on-board systems may include suitably configured systems which pre-process information available from various on-board sources, like e.g. sensors, and provide the result of such pre-processing to the data processing system of the system according to the invention.

The data processing system is configured to evaluate the received information on the position and state of motion of detected target entities and on the state of the vehicle in order to determine a likelihood of a collision between at least one of the detected target entities and the vehicle. The data processing system is furthermore configured to send a control signal to at least one of a brake system of the vehicle to activate brakes of the vehicle, and/or to a driving engine or a clutch system of the vehicle in order to reduce a driving torque of the vehicle, if the likelihood of a collision is above a pre-defined threshold. The system is configured to monitor a speed of the vehicle and not to impede a motion of the vehicle if the speed of the vehicle is above a pre-defined threshold.

In an embodiment, the system is configured to be switched on and off by a driver of the system; for this purpose, a button, switch or other input device, including for example a suitable entry in a control menu, may be provided. The entry in the control menu may be accessible by any means known in the art, for example a touchscreen or a display coupled with a track ball.

In an embodiment the system is configured to deactivate itself, if a driver of the system repeatedly sends driving commands to the vehicle. For example, the driver may repeatedly press the throttle pedal, and if a number of such presses within a pre-defined time period is above a pre-defined threshold, the system deactivates and no longer impedes vehicle motion.

In an embodiment the data processing system is configured not to send the control signal if a number of target entities detected by the scanning system within a pre-defined time-period is above a pre-defined threshold, as a non-limiting example for instance above ten target entities per minute. In this embodiment the driver can still move the vehicle, even if there is heavy traffic in the lane the driver wishes to enter.

The scanning system may include at least one of the following: a radar system, a LIDAR system, a camera, an ultrasonic emitter and receiver for detecting target entities and determining their position and state of motion. Of course, the scanning system may include combinations of the options just mentioned. The scanning system may also include more than one emitter-receiver combination for any of LIDAR, radar, ultrasound, and may include more than one camera, in each case positioned at different locations of the vehicle in order to obtain a wide enough scanning angle for the scanning system. The scanning system may be configured to scan for target entities to both sides, i.e. to the left and to the right, of the vehicle. Impeding the movement of the vehicle in this case is only necessary if target entities are detected in a lane to the side of the vehicle towards which the driver intends to move, indicated for example by a turning position of the steering wheel.

BRIEF DESCRIPTION OF THE DRAWINGS

Below the invention and its advantages will be described further with reference to the accompanying figures, in the context of which non-limiting embodiments of the invention are discussed.

DETAILED DESCRIPTION

Figure 1:
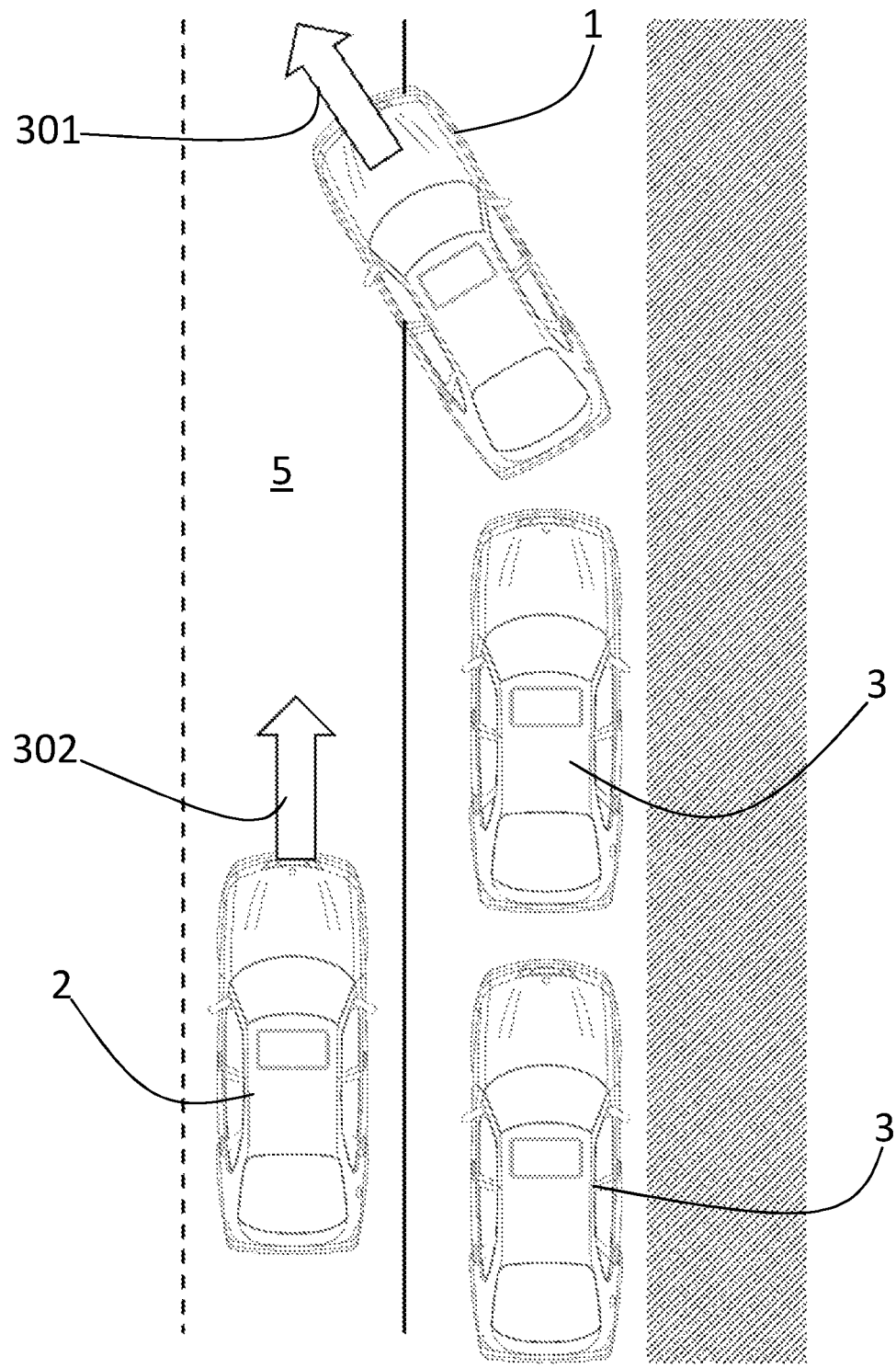
FIG. 1 shows a typical situation in which the invention is intended to avoid a collision.

FIG. 1 shows a situation in which several vehicles (cars) 1, 3 are parked to the side of a traffic lane 5. One of the vehicles 1 is in the process of leaving the parking position and entering the traffic lane 5, presently moving along a direction 301. A target entity 2 (in this example also a car) is moving along the traffic lane 5 in a direction 302. If the target entity 2 continues along its direction 302 of movement there will be a collision between the target entity 2 and the vehicle 1, unless the vehicle 1 moves into the traffic lane 5 and acquires a high enough speed before target entity 2 reaches the vehicle 1 or unless vehicle 1 again moves out of the traffic lane 5 back into the parking position. The latter option usually requires a relatively long reaction time. For the former option, a driver of the vehicle 1, in order to avoid a collision, has to spot target entity 2 and make a sound judgement of the speed of the target entity 2 prior to moving the vehicle 1 into the position shown in FIG. 1. A driver may fail to spot target entity 2, for example because of reduced visibility conditions or because the driver is distracted; the driver may also misjudge the speed of the target entity 2, a possibility which also exists in cases where an on-board system of the vehicle 1 generates a warning signal to indicate the presence of the target entity 2. The situation shown is one of the situations in which the present invention is intended to reduce the risk of a collision.

FIG. 2 shows again a situation in which several vehicles (cars) 1, 3 are parked to the side of a traffic lane 5. The driver of one of the vehicles 1 intends to move the vehicle 1 into traffic lane 5. A target entity 2 (here a car) is approaching the vehicle 1 along the traffic lane 5, moving in a direction 302. The system according to the invention on board the vehicle 1 performing the method according to the invention, scanning lane 5 has detected target entity 2, along with information on the position and the state of motion, in particular speed and direction of movement, of target entity 2. The system has also detected information on the state of the vehicle 1 which indicates that the driver intends to move the vehicle 1 into traffic lane 5. For example, the system has detected that an engine of vehicle 1 is running, that a steering wheel of vehicle 1 is turned to a position for moving into lane 5, that a gear of the vehicle 1 is set to a driving mode, a throttle pedal of the vehicle 1 is pressed, also maybe that a blinker of vehicle 1 is activated. The system, based on the position of target entity 2 relative to the vehicle 1 and on the speed of target entity 2 evaluates a likelihood of a collision between target entity 2 and the vehicle 1, if the vehicle 1 were to move into the traffic lane 5. If the resulting likelihood of a collision is above a pre-defined threshold, the system impedes movement of the vehicle 1, by applying brakes of the vehicle 1 and/or reducing the driving torque of the vehicle 1. In the situation shown in FIG. 2, the resulting likelihood is above the pre-defined threshold, and therefore vehicle 1, contrary to the situation without the inventive system shown in FIG. 1, does not move into the traffic lane 5 but remains in the parking position. A collision between vehicle 1 and target entity 2 is reliably avoided.

Figure 2:
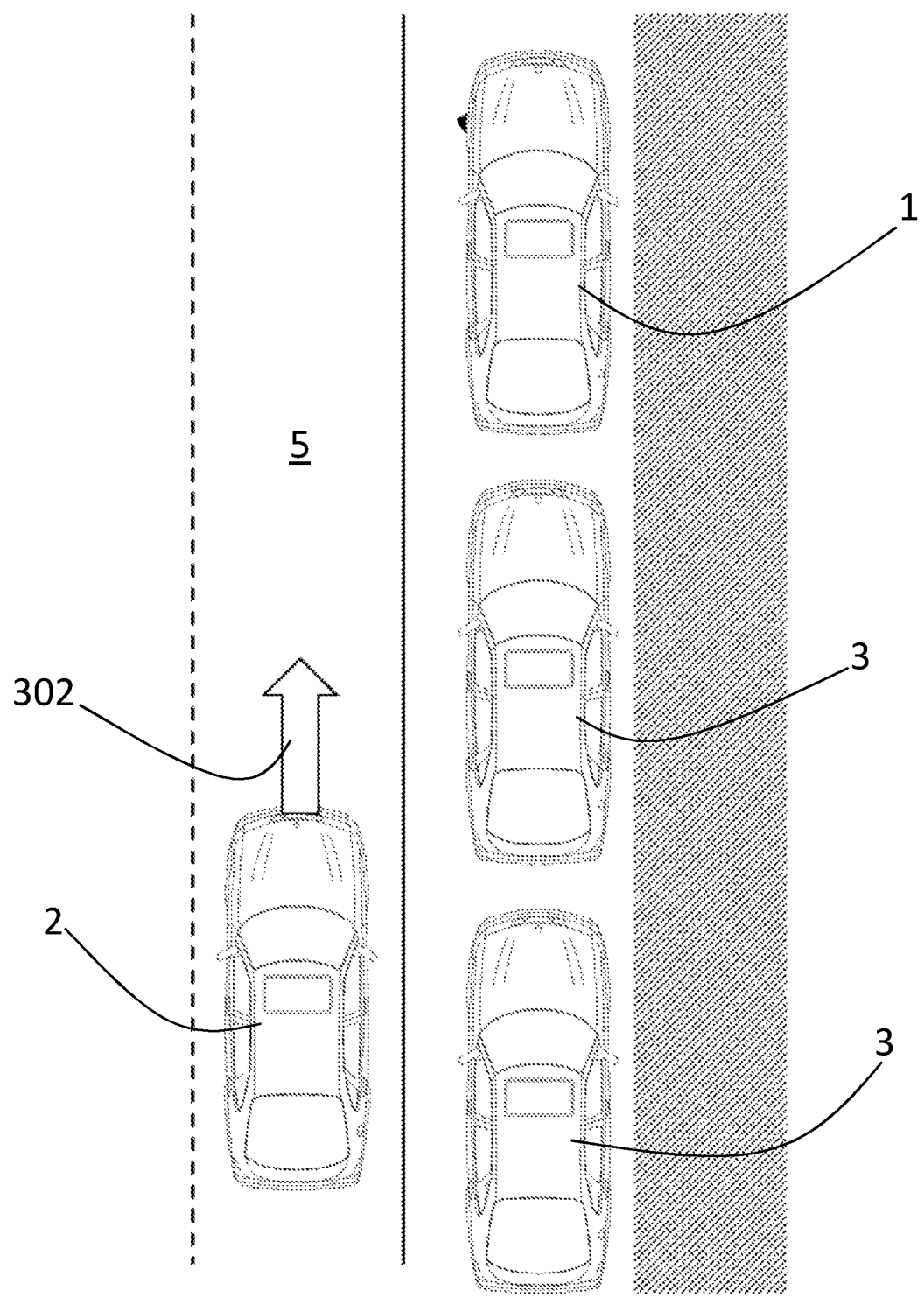
FIG. 2 shows a situation corresponding to FIG. 1, in which the invention is used.
Figure 3:
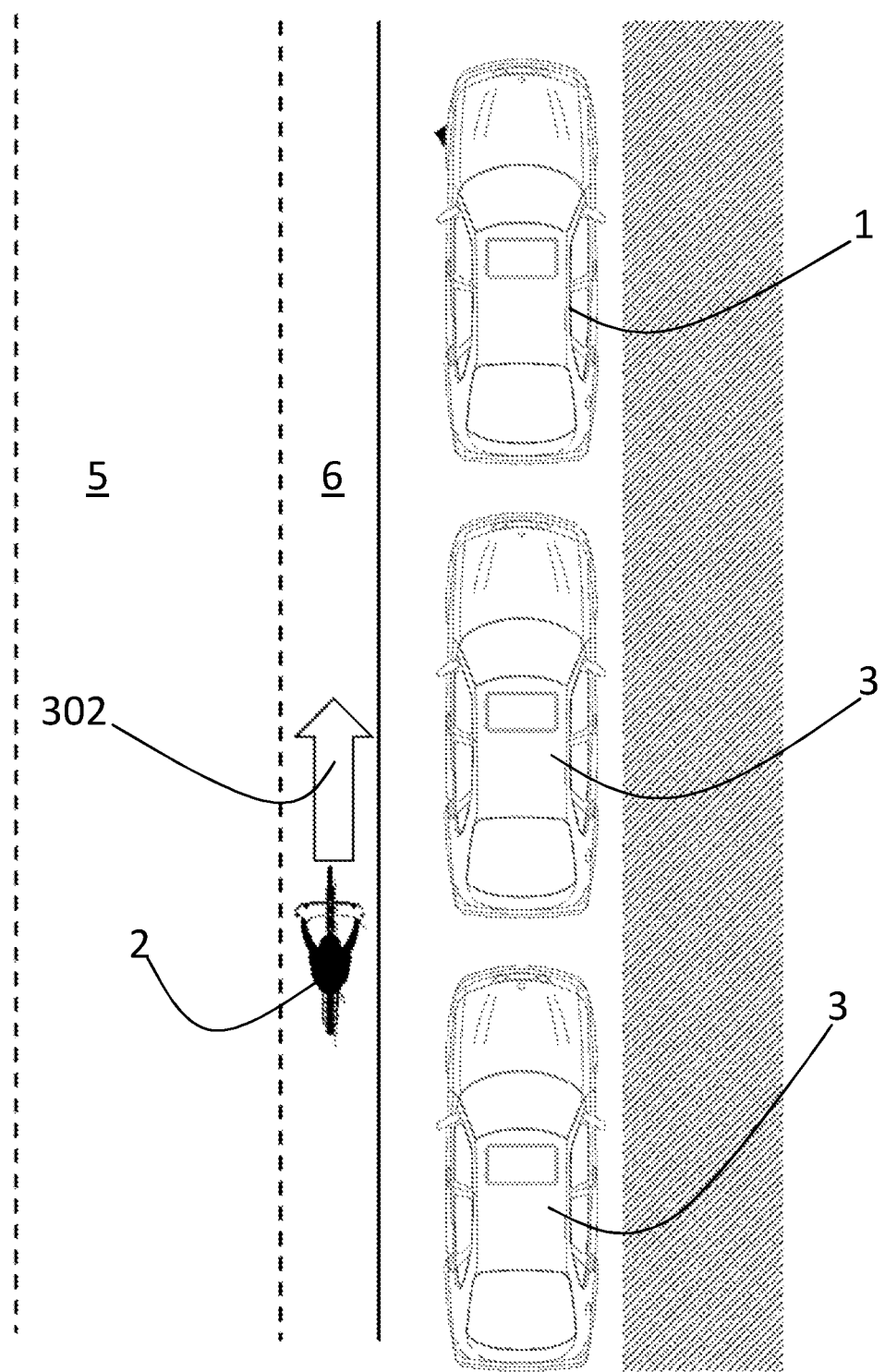
FIG. 3 is analogous to FIG. 2, with a different target entity.

FIG. 3 shows a situation similar to the situation shown in FIG. 2. Here, there is a bicycle lane 6 between vehicles 1, 3 in parking position and a traffic lane 5. A target entity 2, here a cyclist, is moving along bicycle lane 6 in a direction 302. Parallel to what has been described for FIG. 2, the system according to the invention on board vehicle 1 detects the target entity 2 and here prevents vehicle 1 from moving into traffic lane 5 across bicycle lane 6, if there is a likelihood of a collision between the vehicle 1 and the target entity 2 above the pre-defined threshold. In a situation as shown in FIG. 3 the system may not only scan bicycle lane 6 but additionally also traffic lane 5 for target entities, and impede movement of the vehicle 1, if the system detects a target entity in traffic lane 5 and finds a likelihood for a collision with this detected target entity above the pre-defined threshold.

Figure 4:
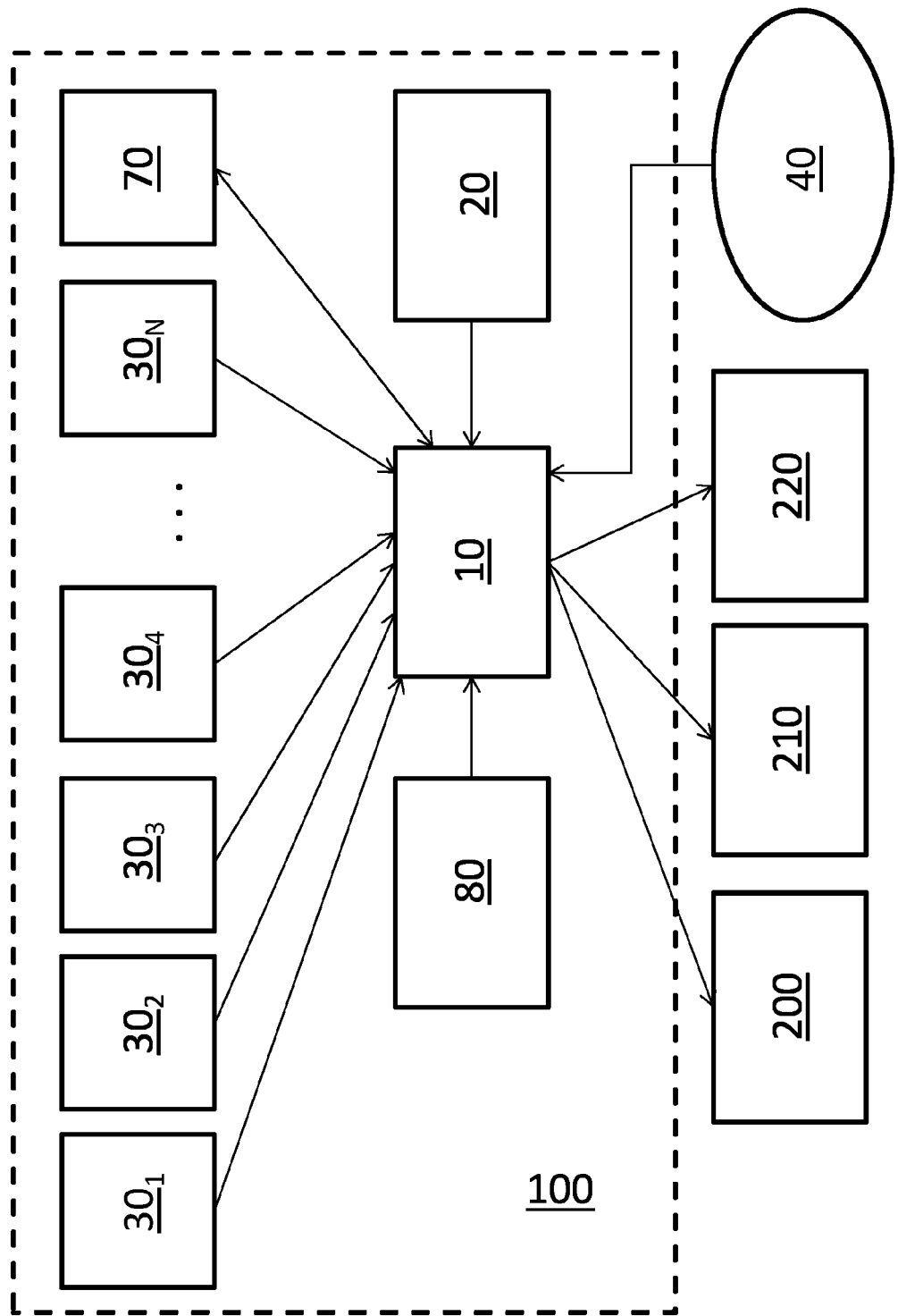
FIG. 4 is a schematic of an embodiment of the system according to the invention.

FIG. 4 schematically illustrates the system 100 according to the invention. The system 100 includes a data processing system 10, which is connected to a scanning system 20, and plural sensors $30_1$ to $30_N$. In the embodiment shown, the data processing system 10 is also connected to a driver interface 80 and a database 70. The scanning system 20 is configured to scan at least one lane to a side of a vehicle on board of which the system 100 is located for target entities and to determine a position of a detected target entity relative to the vehicle and a speed of the target entity. The plural sensors include a sensor $30_1$ for the speed of the vehicle, sensors $30_2$ and $30_3$ providing information on an intention of a driver of the vehicle to move the vehicle, like for example a sensor $30_2$ indicating a position of a throttle pedal and a sensor $30_3$ indicating a gear set to a driving mode, and a sensor $30_4$ indicating a turning position of a steering wheel of the vehicle 1. As indicated, the system 100 may comprise further sensors. The database 70 holds information on previous indications of at least one of the sensors $30_1$ to $30_N$; this additional information enables the data processing system 10 to more reliably assess the intentions of the driver. For example, the database 70 may store a number of presses of the throttle pedal by the driver during e.g. the past fifteen seconds and if this number is beyond a pre-defined threshold, the system may no longer impede vehicle movement. The driver interface 80 primarily is used by the driver to switch the system 100 on or off.

The data processing system 10 is configured to send a control signal to brakes 200 of the vehicle and/or to an engine 210 of the vehicle and/or to a clutch 220 of the vehicle, if the data processing system 10 finds a likelihood for a collision above a pre-defined threshold. The control signal sent to the brakes 200 causes the brakes to be applied, thus impeding movement of the vehicle 1. The control signal sent to the engine 210 reduces, possibly entirely, a torque provided by the engine 210 to a drive train of the vehicle. The control signal sent to the clutch 220 reduces, possibly entirely, a torque transmitted along the drive train of the vehicle to wheels of the vehicle. In general, it is advantageous to both apply the brakes 200 and to reduce the torque provided to wheels of the vehicle, for in this case the brakes 200 do not have to act against the torque along the drive train.

Generally speaking the data processing system 10 can include any data processing system suitable to carry out the steps described above. The data processing system 10 in particular may be an embedded system with one or several single-core or multi-core processors, along with memory units storing program instructions to carry out the method according to the invention and holding data processed, like information received from scanning system 20 and sensors $30_1$ to $30_N$. The program instructions can include the various pre-defined thresholds, pre-defined numbers and pre-defined time-periods mentioned above. Database 70 may also reside in these memory units or in a separate memory.

Also illustrated in FIG. 4 is the optional possibility to provide the data processing system 10 with information from a source 40 external to the system 100, but on board the vehicle. The external source 40 may include one or more sensors on board the vehicle, in particular sensors originally implemented in the vehicle for purposes other than the invention. The external source 40 may include one or more pre-processing systems, which receive data from various sources on board the vehicle, e.g. from sensors, perform some processing on this data, and communicate the result of such processing to the data processing system 10.

While the above description constitutes the preferred embodiment of the present invention, it will be appreciated that the invention is susceptible to modification, variation and change without departing from the proper scope and fair meaning of the accompanying claims.

The invention claimed is:

1. A method for collision avoidance of a vehicle, the method comprising:
scanning for target entities in at least one lane to a side of the vehicle with an on-board scanning system and gathering information on a position and a state of motion of at least one target entity detected during the scanning with the on-board scanning system;

gathering, from one or more sensors on board the vehicle, information associated with a state of motion of the vehicle and driver behavior indicative of an intention of a driver of the vehicle to enter into the at least one lane scanned for target entities;

evaluating the gathered information on the position, the state of motion of the at least one target entity, the state of motion of the vehicle, and the driver behavior in order to determine a likelihood of a collision between the at least one target entity and the vehicle;

determining that a speed of the vehicle is below a threshold speed; and impeding motion of the vehicle, by activating brakes of the vehicle and/or reducing a driving torque of the vehicle, based on (i) the likelihood of a collision being above a threshold likelihood and (ii) the speed of the vehicle being below the threshold speed.

2. The method of claim 1, wherein the target entities include at least one of a motorized vehicle, a non-motorized vehicle, or a pedestrian.

3. The method of claim 1, wherein the information associated with the driver behavior includes at least one of: an on/off-state of a driving engine of the vehicle, a turning position of a steering wheel of the vehicle, a set gear of the vehicle, an on/off-state of a blinker, or an acceleration command received from the driver.

4. The method according to claim 1, wherein the state of motion of the vehicle includes the speed of the vehicle.

5. The method according to claim 1, wherein the evaluating of the gathered information results in determining that the likelihood of a collision is above the threshold likelihood if a relative speed between at least one of the at least one target entity and the vehicle is above a threshold relative speed.

6. The method according to claim 1, wherein the evaluating of the gathered information results in determining that the likelihood of a collision is above the threshold likelihood if a time for at least one of the at least one target entity to approach within a minimum distance from the vehicle is below a threshold time.

7. The method according to claim 1, wherein evaluating the gathered information further includes evaluating information from an on-board source external to the system.

8. A system for collision avoidance of a vehicle, the system being on board the vehicle and comprising:

a scanning system configured to scan for target entities in at least one lane to a side of the vehicle;

one or more sensors configured to provide information on a state of motion of the vehicle; and a data processing system connected to the scanning system to receive information on position and state of motion of at least one target entity detected by the scanning system and connected to the one or more sensors to receive information on the state of motion of the vehicle and on driver behavior indicative of an intention of a driver of the vehicle to enter into the at least one lane to a side of the vehicle;

wherein the data processing system is configured to:
evaluate the received information on the position and state of motion of the detected at least one target entity and on the state of motion of the vehicle and on the driver behavior in order to determine a likelihood of a collision between the detected at least one target entity and the vehicle;

determine that a speed of the vehicle is below a threshold speed; and send a control signal to at least one of a brake system, a driving engine, or a clutch system of the vehicle in order to at least one of activate brakes of the vehicle or reduce a driving torque of the vehicle to impede motion of the vehicle based on the likelihood of a collision being above a threshold likelihood and based on the determination that the speed of the vehicle is below the threshold speed.

9. The system according to claim 8, wherein the system is configured to be switched on and off by a driver of the vehicle.

10. The system according to claim 8, wherein the system is configured to deactivate itself in response to a driver of the vehicle repeatedly sending driving commands to the vehicle.

11. The system according to claim 8, wherein the data processing system is configured not to send a control signal based on a number of target entities detected by the scanning system within a time-period being above a threshold quantity.

12. The system according to claim 8, wherein the scanning system includes at least one of: a radar system, a LIDAR system, a camera, or an ultrasonic emitter and receiver.

13. The system according to claim 8, wherein the data processing system is configured to receive information from an on-board source external to the system.

* * * * *